United States Patent
Obitts et al.

(10) Patent No.: US 7,651,649 B2
(45) Date of Patent: Jan. 26, 2010

(54) FOLDABLE DURABLE PRODUCT, SUCH AS A PATIENT AID DEVICE OR WALKER, AND METHOD OF FORMING SAME

(76) Inventors: Shane Obitts, 120 Illinois Cir., Elyria, OH (US) 44035; James Reichlin, 199 Overbrook Rd., Elyria, OH (US) 44035

( * ) Notice: Subject to any disclaimer, the term of this patent is extended or adjusted under 35 U.S.C. 154(b) by 75 days.

(21) Appl. No.: 11/547,897

(22) PCT Filed: Apr. 7, 2005

(86) PCT No.: PCT/US2005/011966
§ 371 (c)(1), (2), (4) Date: Aug. 6, 2007

(87) PCT Pub. No.: WO2005/099991
PCT Pub. Date: Oct. 27, 2005

(65) Prior Publication Data
US 2008/0128008 A1 Jun. 5, 2008

Related U.S. Application Data

(60) Provisional application No. 60/560,067, filed on Apr. 7, 2004.

(51) Int. Cl.
B29C 45/14 (2006.01)

(52) U.S. Cl. .................. 264/242; 264/261; 264/266

(58) Field of Classification Search ............... 264/242, 264/261, 266; 425/108, 501, DIG. 109, DIG. 218; 29/434, 527.1, 527.4
See application file for complete search history.

(56) References Cited

U.S. PATENT DOCUMENTS

| | | | |
|---|---|---|---|
| 3,031,713 A | * | 5/1962 | Ramien ................. 16/384 |
| 4,518,002 A | | 5/1985 | Battiston, Sr. et al. |
| 4,576,775 A | * | 3/1986 | Kaeufer et al. ............. 264/323 |
| 4,830,035 A | | 5/1989 | Liu |
| 5,618,870 A | * | 4/1997 | Flood et al. ............... 524/269 |
| 5,862,825 A | | 1/1999 | Leonard |

* cited by examiner

Primary Examiner—Joseph S Del Sole
Assistant Examiner—James Sanders
(74) Attorney, Agent, or Firm—Fay Sharpe LLP

(57) ABSTRACT

A method of manufacturing a patient aid device, such as a walker (W), includes the steps of molding a polymer or plastic connector (60) over first and second metal structural members (22, CB) to maintain the structural members in a first geometrical relationship. After the plastic has cured, the method includes the step of rotating the first structural member or front leg (22) relative to the plastic connector (60) to form an integral hinge without any seam in the plastic. The resultant walker includes front legs (22) hinged via the connectors (60) at opposite ends of the front cross brace (CB). The front leg (22) and rear leg (24) of each side frame (SF1, SF2) of the walker are interconnected by a lower cross brace (40) that has plastic preferably molded about the entire periphery of each leg.

16 Claims, 16 Drawing Sheets

FOLDABLE DURABLE PRODUCT, SUCH AS A PATIENT AID DEVICE OR WALKER, AND METHOD OF FORMING SAME

This application is the national filing of and claims the benefit of PCT Patent Application Ser. No. PCT/US2005/011966, filed on 7 Apr. 2005, and claims the benefit of U.S. Provisional Patent Application Ser. No. 60/560,067, filed on Apr. 7, 2004, the disclosures of which are incorporated herein by reference.

BACKGROUND OF THE INVENTION

This invention relates generally to a durable product, and more particularly to a foldable product, and finds particular application as a patient aid device such as a walker, and a method of forming same. The invention is particularly applicable to a composite assembly for construction and use with foldable products of this type.

Walkers, in general are well known and are used to assist ambulation and provide additional stability for persons who are, for example, elderly, infirm, have a disability, or are in rehabilitation. Conventional walker designs have four legs in contact with the ground to provide stability, and yet are sufficiently light-weight for ease of use.

Traditionally, these walkers have been fabricated from light-weight hollow or tubular material such as steel, aluminum, etc. It is common to fabricate each side frame so that the first and second legs and a handle portion are formed from a single, unitary bent tubular member, i.e., the inverted U-shaped structure, where the terminal ends define first (front) and second (rear) legs of the structure and the bight portion defines the handle portion. Likewise, it is common to incorporate a handgrip, such as a PVC or closed cell foam pad, that is slid over and provided on a horizontal portion of the side frame assembly. Generally, the first and second side frame assemblies are joined by a front cross brace member(s).

It is also common to employ adjustable height legs that allow the height of the walker to be selectively increased or decreased for customized use. For example, each leg receives a sleeve member formed with a series of longitudinally spaced openings adapted to selectively register with similarly spaced openings formed in the lower ends of the legs. A spring-biased pin is mounted within the lower ends of the legs and biased outwardly through aligned openings in the legs and leg extensions to select the desired height of the adjustable leg. It is also common to mount rubber tips to the ends of the leg extensions to resist slipping and undesired movement.

Collapsible or folding walkers are also generally well-known in the art and fold in a compact manner so that the walker is easily stored or transported during travel. As previously noted, a front cross brace assembly typically spans and interconnects the first and second side frame assemblies. Again, it is common to use a light-weight metal tubular structure because of the desired strength and minimum weight as a cross brace member. Interconnection of the front cross brace member with the side frame assemblies, particularly in a foldable or selectively hinged arrangement, usually requires a large number of components. There is also an attendant cost associated with the labor-intensive steps to manufacture and assemble the foldable walker. For example, one or more metal tubes are bent along their length, and secured to first and second sleeves at opposite ends. Usually the ends of the tubes are notched and bell-mouthed to conform the ends to the sleeves. The sleeves are received over the front legs of respective side frame assemblies. It is necessary to rigidly and securely interconnect the cross brace to the sleeves, for example, through a welding or brazing operation.

A number of latch or locking mechanisms have been developed in the art to allow the side frame assemblies to pivot or rotate into a collapsed or storage position, and likewise to deploy into an open, locked position for use. The following list of patents is not intended to be exhaustive, but is representative of various locking mechanisms: U.S. Pat. Nos. 2,796,911; 3,658,079; 3,688,789; 3,690,652; 3,783,886; 3,993,088; 4,298,016; 4,518,002; 5,188,139; 5,201,333; 5,433,235; 5,529,425; and 5,853,219. As is evident in the prior art, the latching/locking mechanisms are formed from multiple components and thus are also expensive to manufacture and assemble the various components together.

More recently, foldable or collapsible walkers have been developed that incorporate plastic molded components into the assembly. For example, some have developed a plastic front cross brace member, while others additionally include molded side frame assemblies in conjunction with the front cross brace member. Representative patents include D373,555; U.S. Pat. Nos. 5,579,793; 5,862,825; and 6,014,981.

Even with these various designs, a trade-off exists among strength, weight, and cost to manufacture and assemble. Moreover, maintaining the features and benefits available in existing commercially available designs while trying to enhance the product design in one of the other areas is also a particular challenge. Accordingly, a need exists to develop a walker that requires fewer components to manufacture, sub-assemble, and assemble to yield a final product that can be produced at a much lower total cost, while still maintaining the benefits and features of known arrangements.

SUMMARY OF THE INVENTION

A method of manufacturing a product that includes first and second structural members joined with plastic and in which one of the first and second structural members can rotate relative to the plastic comprising the steps of providing first and second structural members; molding a polymer member over the first and second structural members to maintain the structural members in a first geometrical relation; and rotating the first structural member relative to the polymer member after the polymer has cured to form an integral hinge without any seam in the polymer member.

A method of manufacturing a patient aid device, such as a walker, including the steps of molding a polymer or plastic over first and second metal structural members to maintain the structural members in a first geometrical relationship. After the plastic has cured, the method includes the step of rotating the first structural member relative to the plastic to form an integral hinge without any seam in the plastic.

A durable product includes first and second structural members that are interconnected in a desired geometrical relation with a plastic molded over portions thereof. The first structural member rotates relative to the plastic in order to define a hinge or pivoting relation.

A foldable durable medical product is provided, such as a walker, includes first and second side frame assemblies, each including first and second legs interconnected adjacent first ends by a handle and further interconnected at second ends by a lower brace member. A front cross brace interconnects the first and second side frames.

The lower brace member preferably encompasses the entire circumferential extent of the legs without any seam.

A preferred molding operation interconnects at least the front cross brace to the first and second side frame assemblies in a single step.

A tube connector/lock housing joins the side frame(s) to the front cross brace, and in a preferred embodiment includes an improved, simplified locking pin housing assembly for selectively locking the side frame assembly(ies) relative to the cross brace member.

The tube connector/lock housing cooperates with a lock body to support the front cross brace in the assembly. Alternatively, the tube connector/lock housing can also engage the lock body by being riveted into place.

The molded lock body is secured to a side frame first (front) leg and cooperates with the tube connector/lock housing to selectively fold the side frames about the first leg to a storage position. The lock body cooperates with the lock pin assembly, and houses a biased pin that is selectively actuated by a handle allowing the side frames to be folded.

A major benefit of the invention is the reduced cost to manufacture.

Another advantage resides in the ability to eliminate a number of manufacturing processes and components to create and assemble the front cross brace, side frames, lower braces, and latch assemblies, and to assemble these components together (it is believed that twenty eight components or process steps can be eliminated over known arrangements).

Yet another advantage of the invention resides in the ability to secure the front cross brace assembly to the side frames while simultaneously creating the lock pin housing and lower braces in one operation.

Another feature is the ability to mold the lower braces around the entire circumference of the side frame legs thereby providing superior torsional strength of the resulting side frame assembly.

Other features and benefits include strength, durability, weight, appearance, ease of use, low cost of manufacture and assembly, integrity of the frame legs, lack of seams, and cleanliness.

Still other features and benefits of the invention will become apparent to those skilled in the art upon reading and understanding the following detailed description.

DESCRIPTION OF THE PREFERRED EMBODIMENT

Figure 1:
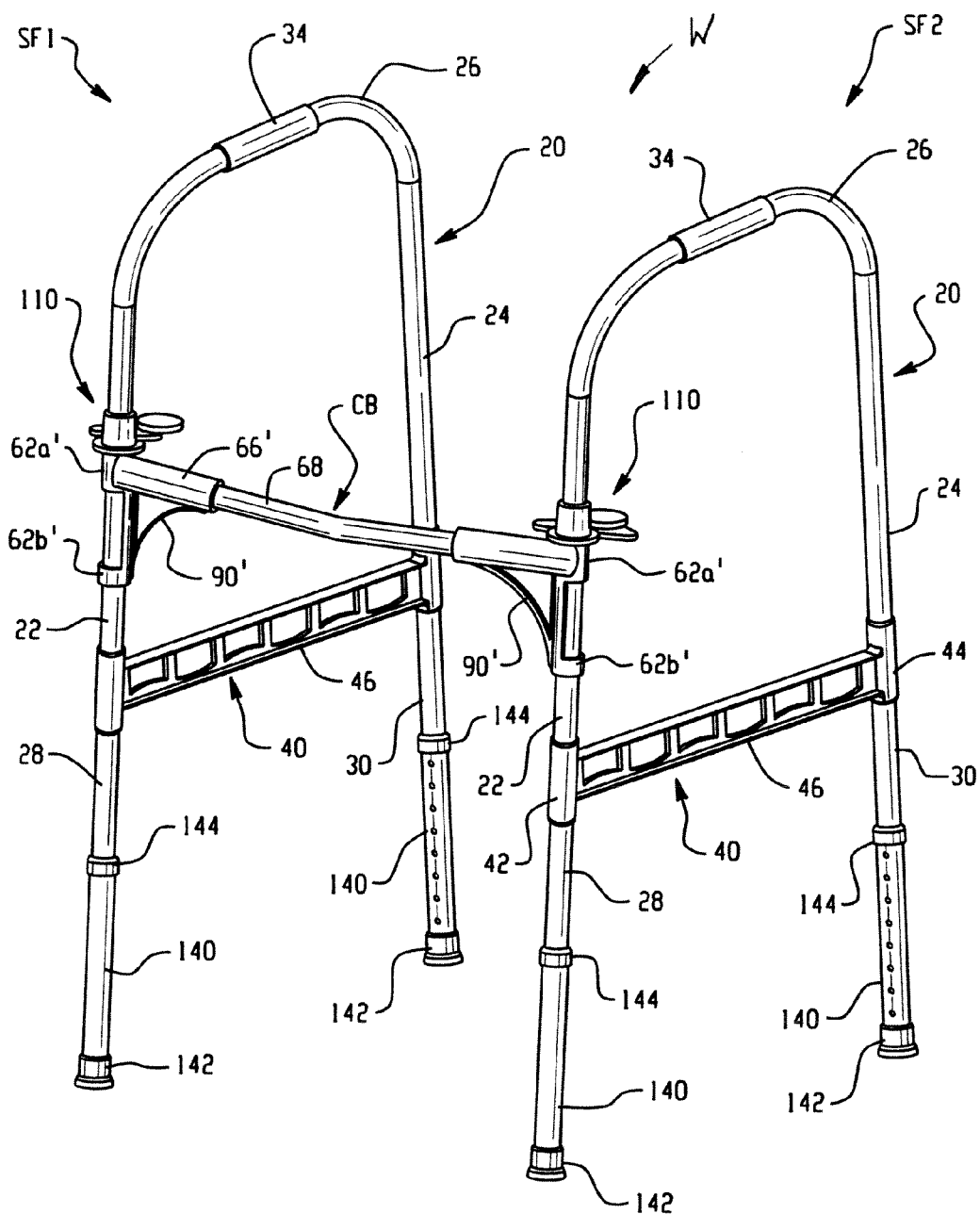
FIG. 1 is an isometric or perspective view of a durable medical health product such as a walker formed in accordance with the present invention.

The drawings illustrate a preferred embodiment of the invention only, and are not intended to limit the invention. More particularly, FIG. 1 shows a walker W which includes a pair of side frames SF1 and SF2 interconnected by a front cross brace member or cross brace CB. The side frames are configured, as will be described below, to selectively pivot or rotate relative to the front cross brace to allow the walker to be collapsed or folded for storage or shipment. FIG. 1 illustrates the walker in the assembled, operative position where the side frames are disposed in generally parallel relation and extend generally perpendicularly from the front cross brace member. As will be appreciated, when folded or collapsed, the side frames are rotated inwardly, generally about a longitudinal axis of the front, first leg thereof, for positioning in planes generally parallel to that of the front cross brace member.

Figures 2, 3:
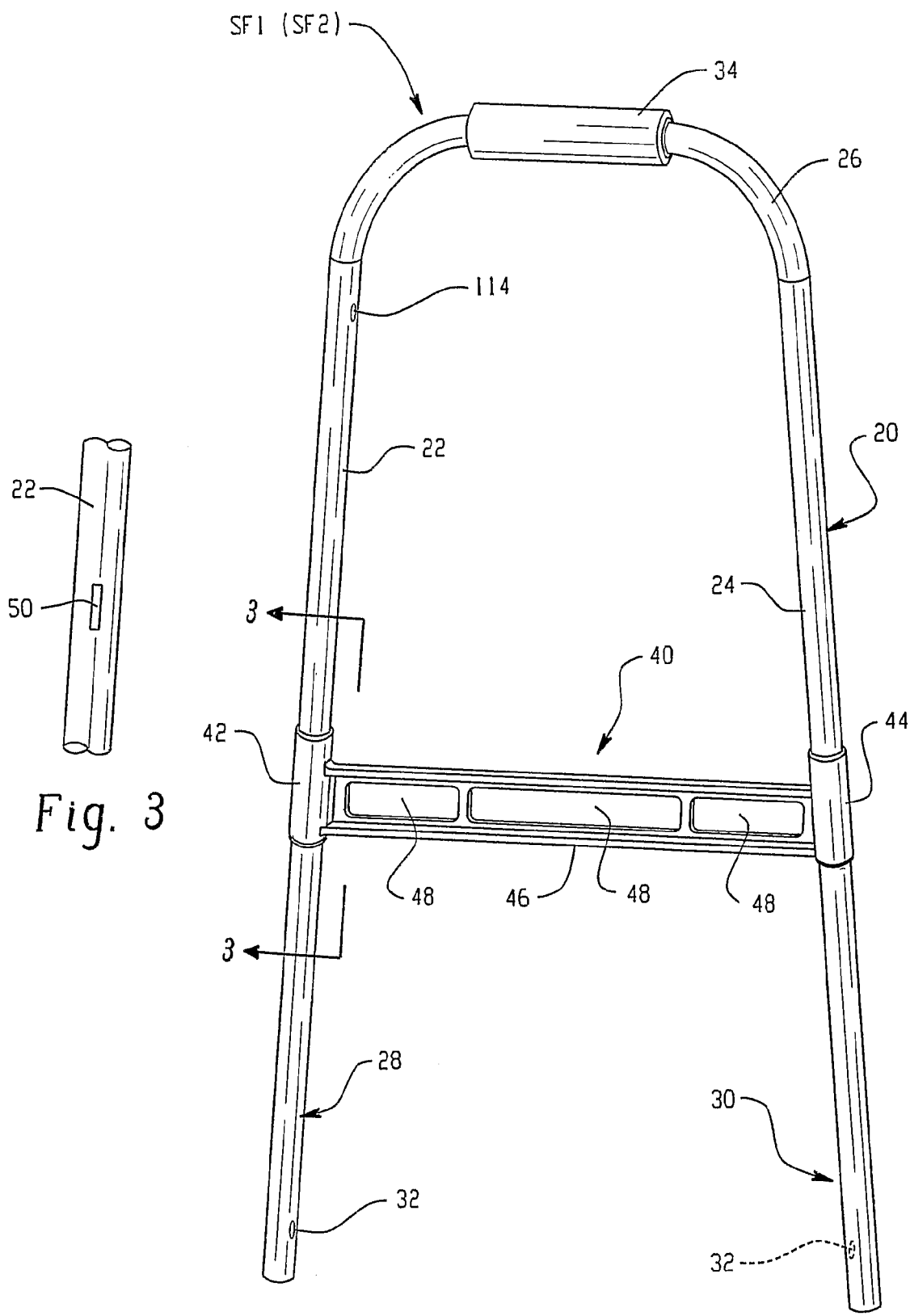
FIG. 2 is a view at a preliminary assembly stage of a side frame.
FIG. 3 shows one of the legs, taken generally along the lines 3-3 of FIG. 2 with the lower leg brace removed.

With continued reference to FIG. 1, and additional reference to FIG. 2, the structure, operation, and description of one side frame is applicable to the other unless particularly noted otherwise. Preferably, the side frame includes a first metal structural member such as a one-piece, inverted generally U-shaped side frame member 20 having leg portions 22, 24 extending outwardly from a handle portion 26. As will be appreciated, the legs 22, 24 extend in a generally diverging, angled relation relative to one another as they proceed outwardly from the handle portion 26. Outer, or lower ends 28, 30 of the legs each include an opening 32 formed through a side wall. The opening cooperates with a slidable sleeve or leg extension to selectively adjust the height of the walker. Again, more particular details of the structure and function of this height adjustment will be provided below.

A handgrip 34 is provided on the handle portion 26 of the side frame member. Preferably, the handgrip 34 is a one-piece sleeve that is received along the generally horizontal handle portion and provides a cushioned handle for the user. In one preferred arrangement, the handgrip is a molded sleeve that is assembled by sliding the handgrip over one of the outer ends 28, 30 of the side frame member into position along the handle portion 26. Alternatively, and as will become more apparent below, the handgrip may be molded to the side frame during the main molding operation. This would allow a more efficient assembly of the handgrip and also allow the manufacturer to create a more ergonomic profile of the handgrip.

Also provided on each side frame member 20 is a one-piece molded lower brace 40. The molded lower brace spans between the first and second legs 22, 24 at a location spaced from the handle portion to provide additional rigidity, stability, and support for the side frame. Particularly, the one-piece molded lower brace is a polymer or plastic construction that may be a composite reinforced polymer. The lower brace includes first and second sleeve portions 42, 44 at opposite ends thereof that are molded about the legs 22, 24 (as will be further described below) to provide a circumferentially continuous structure without a seam, i.e., there is no opening. The term "seam" should not be construed as a parting line which relates to flash or a line of material that is formed on the surface of the plastic as a result of the mold housing coming together. An interconnecting member strut 46 of the lower brace 40 spans the dimension between the sleeves 42, 44 and is also preferably formed in the same molding operation as the sleeves. In the preferred arrangement shown in FIG. 2, the interconnecting member includes voids, openings, or regions of reduced cross-section 48 that decrease the overall weight of the lower brace. It will be appreciated that other designs or conformations of the interconnecting member may be used in an effort to reduce overall weight while providing sufficient strength and durability for the lower brace.

As evident in FIG. 3, a dimple or recess 50 is provided along a portion of each leg 22, 24 to form a locking or anti-rotation means for the sleeves 42, 44 of the lower brace. As will be appreciated, the dimple is formed in each leg during molding of the lower brace so that the molded material fills the recess. For example, the dimple or recess is formed as the mold press is closed, or in response to piston movement of the injection molding process. Therefore, when cured, the radial extent of the material extending into the dimple resists relative movement such as axial, translation or rotation (torsional forces) of the sleeves of the lower brace relative to the respective leg. Thus, the lower brace prevents the side frame legs from moving inwardly, outwardly, laterally, torsionally, and axially.

Additionally formed on each side frame is a combination tube connector/lock pin housing 60. FIGS. 4-9 are particularly illustrative of the tube connector/lock pin housing 60. For purposes of the following discussion, this plastic component 60 will be referred to as a tube connector since it interconnects the first metal structural member (front leg 22) with the second metal structural member (cross brace CB), and does not necessarily require that the lock pin housing be an integral part of the component even though that is preferred. The tube connector includes a first tubular portion 62 received over the first metal structural member, namely the front leg of an associated side frame. For example, as shown here, the first tubular portion 62 has a generally tubular conformation received over the outer diameter of the front leg 22. At an upper end is provided a flange 64 that extends around only a portion of the circumference of the first leg in this preferred embodiment for reasons which will become more apparent below.

Disposed at generally right angles or generally perpendicularly from the first tubular portion 62 is a second metal structural member or second tubular portion 66. The second tubular portion 66 is molded over the front cross brace 68. Here, the cross brace is a tube 68 or preferably a hollow member such as a steel or aluminum tube, although it will be appreciated that alternative profiles such as a custom extruded aluminum profile can be used. Extruded profiles are desirable because of the ease in manufacture and reduced cost, and different profiles may be desired to aid in retention of the front cross brace to the tube connector in which opposite ends are received in respective second tubular portions 66 of the tube connectors associated with each side frame.

Figure 4:
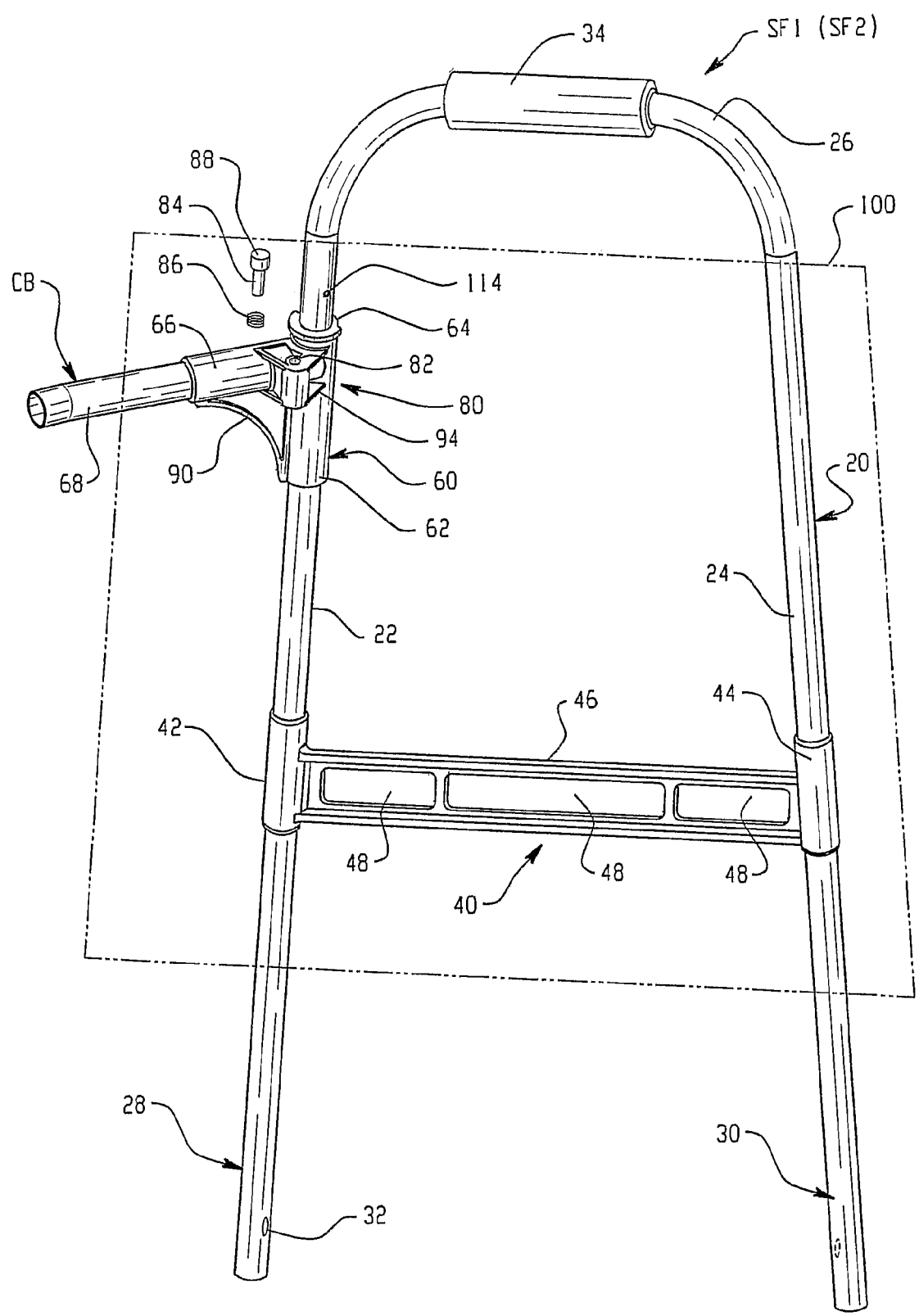
FIG. 4 is perspective view of one side frame during a further stage of assembly with the cross brace member.
Figure 5:
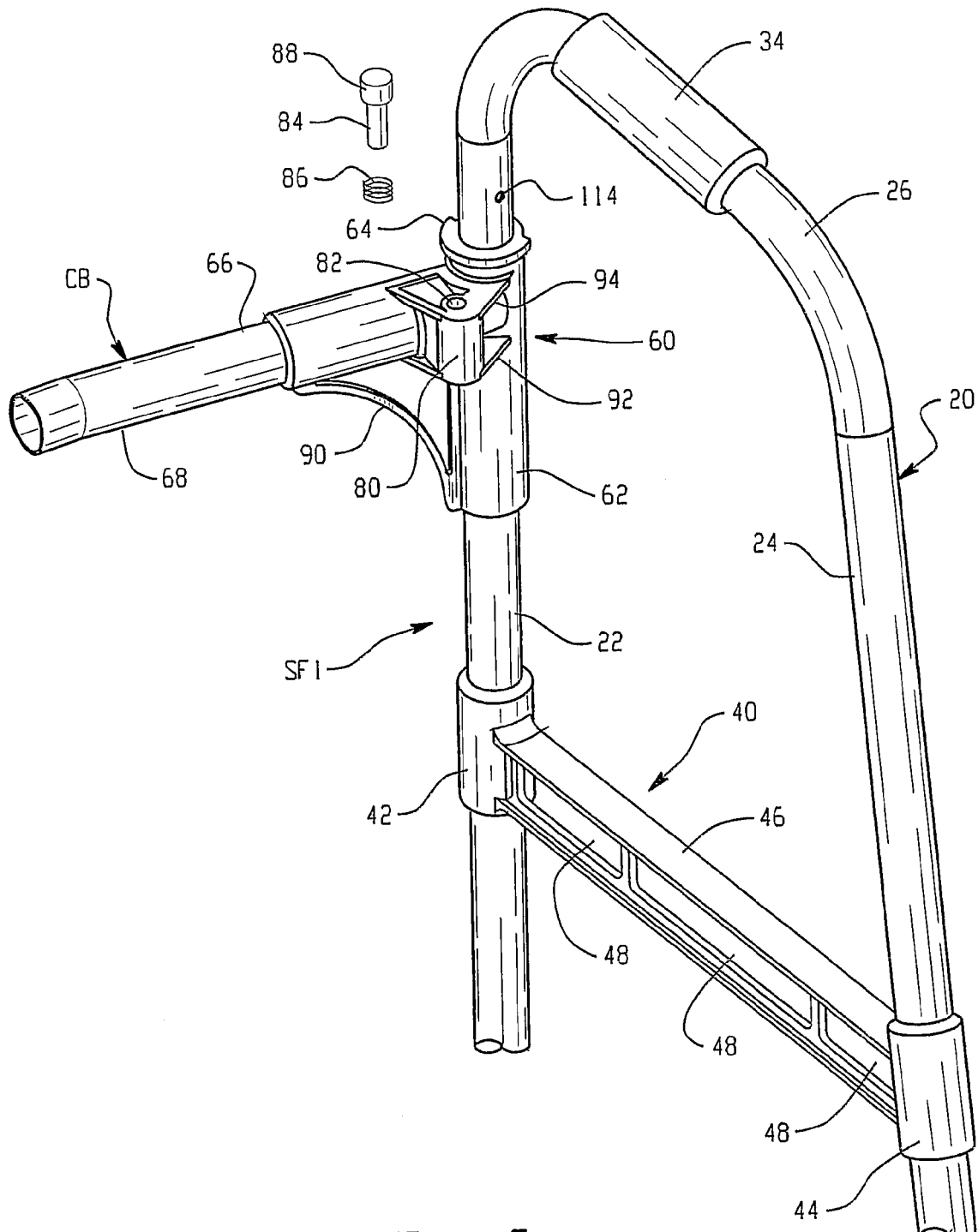
FIG. 5 is an enlarged view similar to that of FIG. 4.
Figure 6:
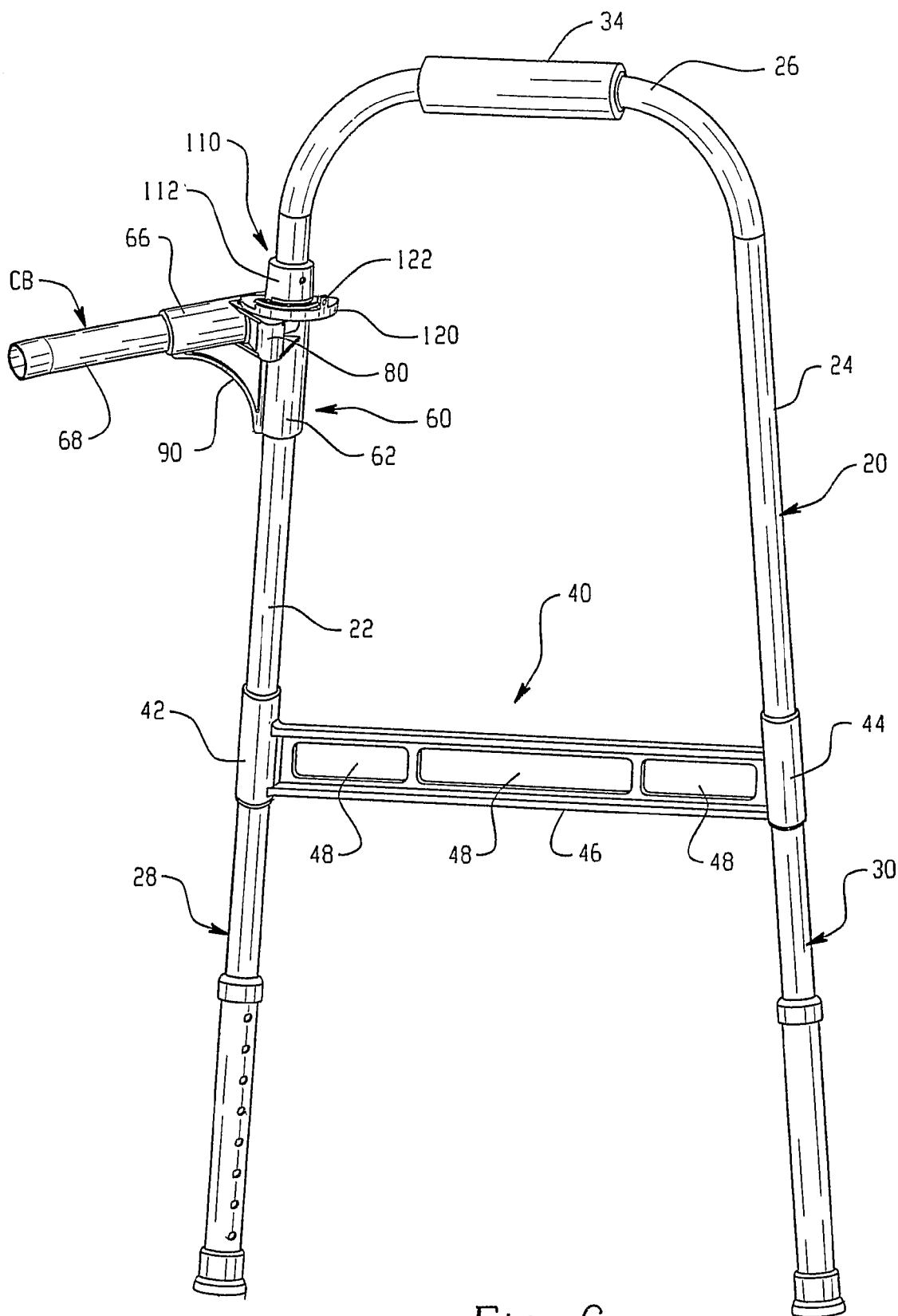
FIG. 6 is a perspective view of one of the side frame assemblies at a further stage of assembly including leg extensions.
Figure 7:
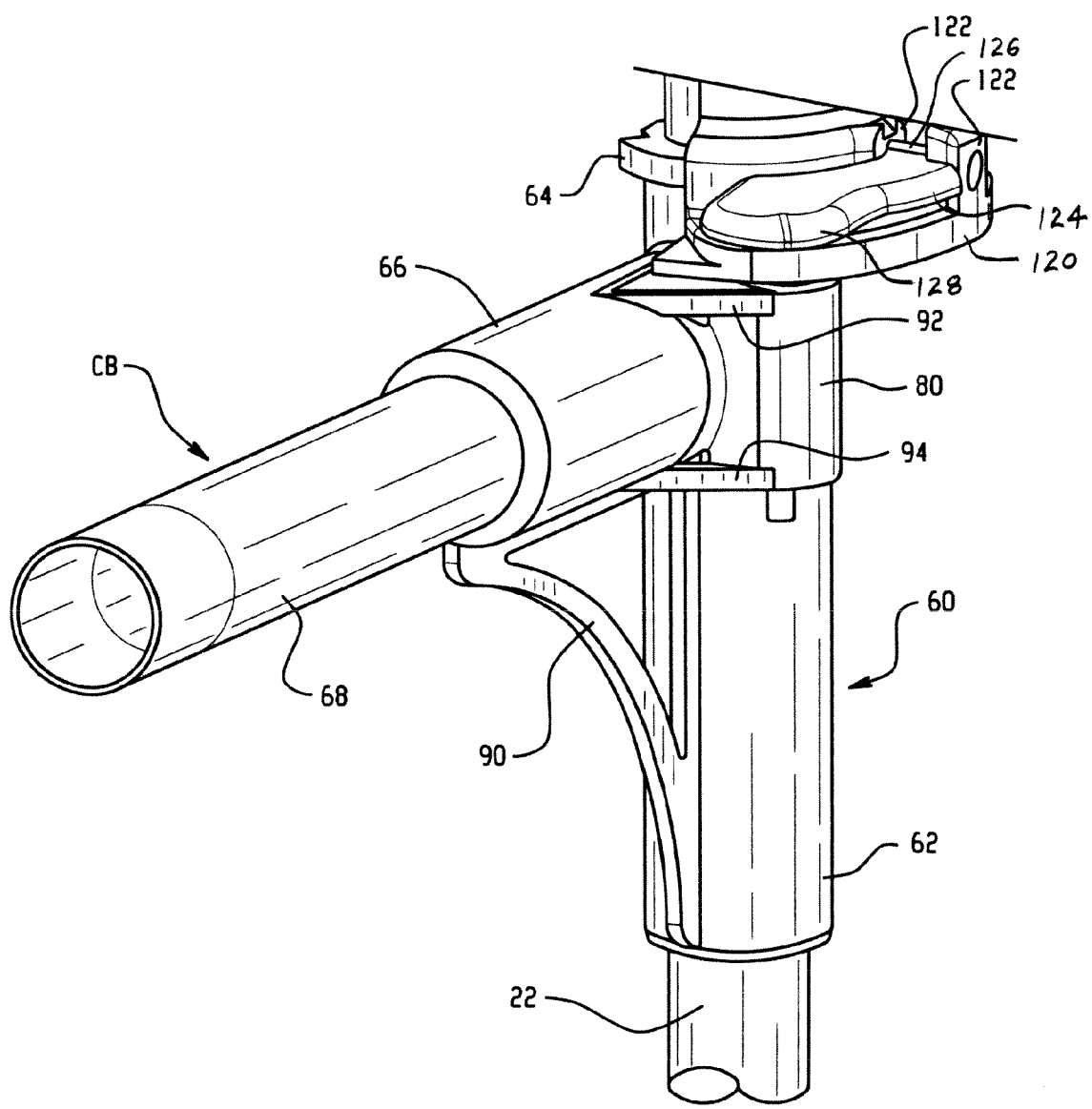
FIG. 7 is an enlarged view of the lock body and lock housing assembly.

Lock housing portion 80 is integrally molded as a part of the tube connector 60 in a preferred arrangement. The housing portion includes a throughbore, opening or recess 82 dimensioned to receive a pin 84 and associated biasing member such as spring 86 (FIGS. 4 and 5). The throughbore 82 extends generally parallel to the longitudinal extent of the lock housing 80 which, in turn, is generally parallel to the longitudinal axis of first tubular portion 62 in this arrangement. The pin 84 preferably includes an enlarged head 88, the underside of which is urged by the spring 86 outwardly from the throughbore 82 into locking engagement as will be further described below. As illustrated in FIGS. 5 and 7, reinforcing members 90, 92, 94 are provided to add further strength and stability to the tube connector. Particularly, first reinforcing member or gusset 90 extends between the first and second tubular portions 62, 66. This provides additional stability against vertical deflecting forces and maintains the desired generally perpendicular relationship between the tube, crossbrace and leg portions. Similarly, second and third reinforcing members 92, 94 are shown as extending outwardly from adjacent tubular portions 62, 66 and adjacent opposite ends of the lock housing 80. These second and third reinforcing members provide the desired support and rigidity for the lock housing, and resist deflecting forces imposed in a generally horizontal direction between these portions of the tube connector/lock housing 60. It will be appreciated that reinforcement may not be required depending on the particular design.

The molded lower braces 40 and the tube connector 60 are preferably formed in a single molding operation (and preferably the lock body is molded in the same operation). More particularly, a mold cavity receives at least one end of the front cross brace tube 68 therein. In addition, at least a portion of the side frame member 20 is received in the mold cavity so that the tube connector and the lower brace are molded about the tube components. As represented in FIG. 4, the region represented by dashed line 100 indicates those portions of the front cross brace and side frame that would at least be received in the mold cavity. It is not necessary that the entire front cross brace member, nor the entire side frame member, be received in the mold; however, such an arrangement is not precluded either and may be preferred. When the tubular member 68 and side frame 20 are positioned therein, the plastic fills the mold cavity and thereby adopts/molds into the form of the molded lower brace 40 extending between the legs 22, 24 of the side frame, and additionally the tube connector 60 interconnects the front cross brace tube 68 to the side frame member, particularly the first leg thereof. By injection molding these components, the disadvantages of multiple manufacturing processes and components used to create the front cross brace, lower cross brace and lock housing, and to assemble these individual components or subassemblies together of the prior art are avoided. Traditional lower cross braces are either a two-piece plastic assembly that is subsequently assembled to the walker side frame by a snap-on means, or traditional lower cross braces are a fabricated aluminum tube that contains a pressed-in-place tube connecting fastener held in place via first and second fasteners extending through both walls of each leg of the side frame.

Similarly, traditional front cross braces are comprised of multiple fabricated steel components. Prior arrangements usually contain a steel cross brace tube that is cut and then either notched or bell mouthed to fit to end tubes. The end tubes are cut steel or aluminum tubes that are either welded or brazed to the front cross brace tube. Additional components and processes are then added to this assembly to create either a lock pin housing or a locking means. When the front cross brace assembly is assembled to the side frames, prior arrangements require the use of an anti-rattle device to minimize play between the assembled parts. It also requires four additional components and one additional assembly operation to provide a supporting means and secure the assembly in place on the side frames.

Therefore, with prior art arrangements, the legs of each side frame must be pierced through both walls. This results in a reduced tube cross-section in the area and, thus, a weakened tube as opposed to an unpierced, circumferentially continuous wall, and it requires additional cost associated with assembly. Potential fatigue can result during use. The snap-on plastic lower brace design of the prior art also does not encompass the side frame leg around the entire 360 degrees without a seam or opening. The open-end or C-clamp design has been commercially successful but allows for torsional and lateral movement of the side frame when in use. On the other hand, use of aluminum lower braces with tube connectors and fasteners raises the issues of piercing the walls of the legs and the fasteners loosening during use and thereby requiring that the fasteners be tightened on a periodic basis.

The design of the present application, however, preferably attaches the front cross brace to the side frames while creating the locking housing and the lower cross braces in one operation. The front cross brace tube is secured to the side frames by creating a tube connector as described above. The tube connector also incorporates a pocket or cavity to house the lock pin assembly and a flange captured by a lock body to support the entire assembly. By molding the tube connector directly on the side frame, the need for any additional anti-rattle devices is eliminated. In addition, the lower cross brace being molded directly on the side frame advantageously eliminates the need for any additional processes or attachment hardware.

If the front cross brace requires bending, the bending operation can be achieved in the mold press, e.g., as the mold press closes, in response to some other event such as movement of the injection molding piston, etc., just prior to the plastic being introduced around the brace, side frame assemblies, etc. Of course, it may be desirable in other circumstances to bend the first cross brace in a separate operation.

Figure 8:
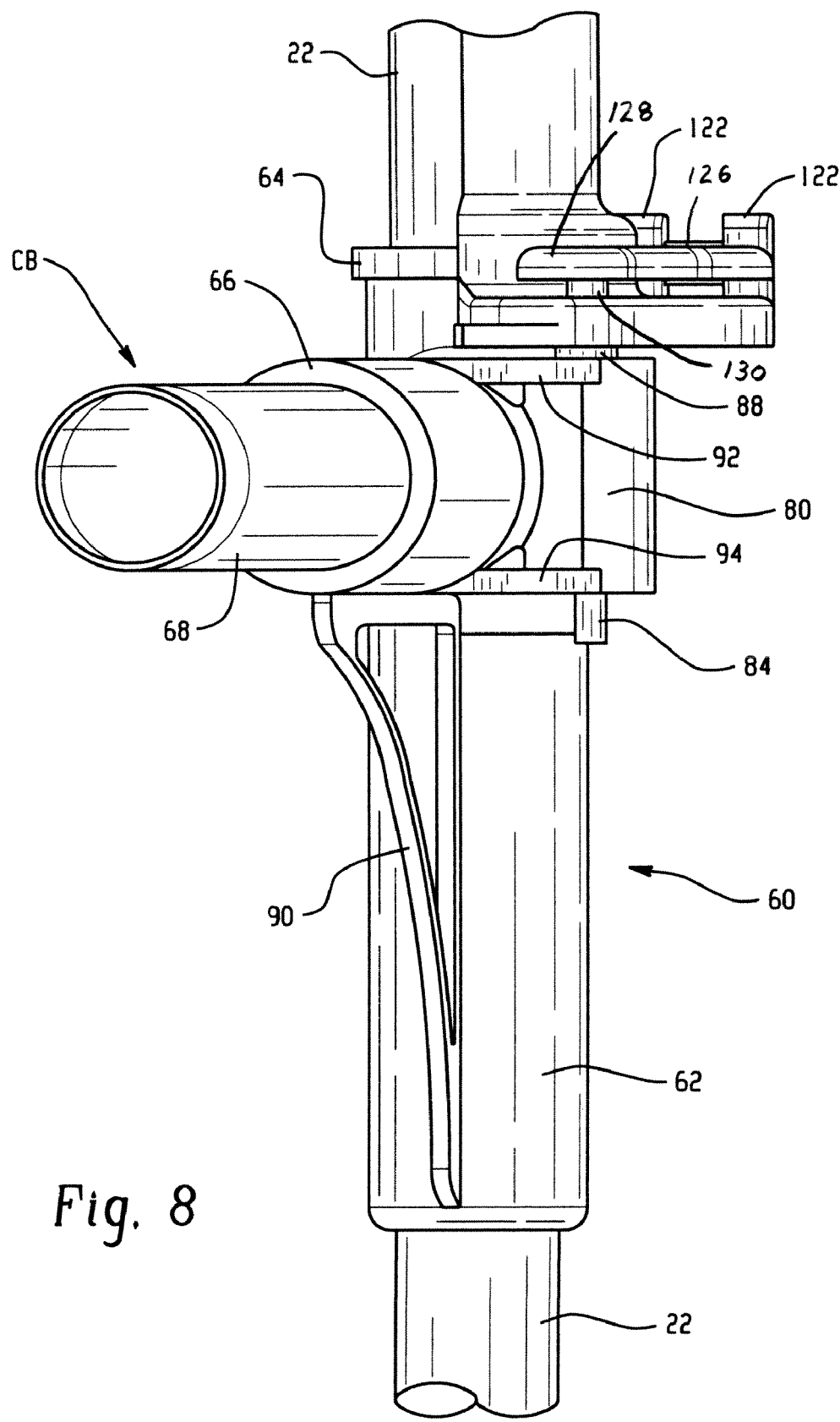
FIG. 8 is an enlarged view further illustrating the features of the lock pin, lock body, and lock housing assembly.
Figure 9:
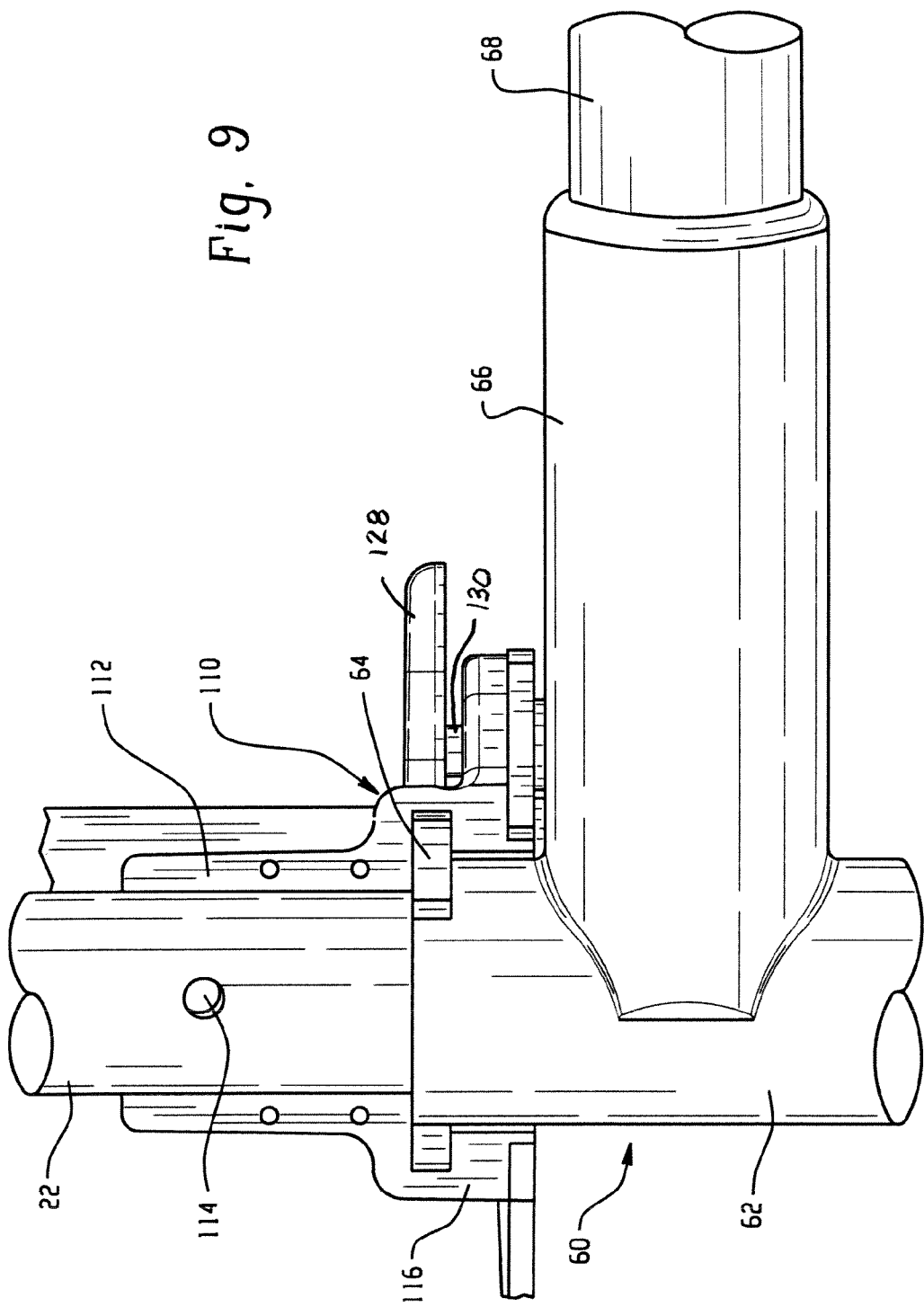
FIG. 9 is yet another view of the lock body and lock housing assembly.

With continued reference to FIGS. 1-5, and additional reference to FIGS. 6-9, another portion of the actuator or locking release mechanism is shown and described in greater detail. Specifically, a molded lock body 110 is received over the front leg of the side frame. As illustrated at FIG. 9, the lock body has a tubular portion 112 that extends about the entire perimeter or circumference of the first leg. The molded lock body 110 is installed onto the side frame prior to the molding operation that forms the molded lower brace 40 and tube connector/lock housing 60. After those components have cured from the molding operation, the molded lock body is positioned in place relative to opening 114 that extends diametrically through the front leg. Thus, the lock body is axially moved from the region above the opening 114 and rotated so that shoulder 116 (which extends over only a portion of the entire perimeter of the lock body) can be received over and around the mating flange 64 of the tuber connector/lock housing. Once the flange of the tube connector/lock housing 60 is captured by the lock body shoulder, a fastener (e.g., pin, rivet, etc.) extends through the tubular portion 112 of the lock body and aligned opening 114 in the front leg. This fastener fixedly secures the lock body to the side frame 20, and further locks the tube connector/lock housing and front cross brace member thereto into a secure relationship relative to the side frames.

As will be appreciated, before the lock body 110 is advanced to its mating position with opening 114, the locking pin 84 and spring 86 are inserted into the lock housing 80 of the tube connector. In this manner, the axial or longitudinal travel of the lock body, and capture of the flange 64 within shoulder 116, captures the pin and spring therein and limits relative movement of these components.

The lock body in this embodiment further includes a ledge or flange 120 extending generally radially outward from the tubular portion. A pair of support members or trunnions 122 extend outwardly from the ledge. The trunnions pivotally support a lock release member or handle 124 that includes a hinge portion 126 and an enlarged actuating surface portion 128 having a protrusion 130 extending outwardly from an underside thereof. The protrusion, as best evidenced in FIGS. 8 and 9, is located over the lock pin. When the actuating portion 128 is depressed, the protrusion pushes the pin downwardly into the lock housing and thereby allows the side frame to pivot or rotate about the longitudinal axis of the first leg 22 relative to the tube connector 60, i.e., relative to the front cross brace assembly CB. The handle is separately molded and is easily assembled by snap-fitting the hinge portion 126 between the trunnions 122.

It will also be appreciated that the lock pin is normally urged outwardly from the lock housing by the spring 86. This outward bias engages a metal stamping or plate that may optionally be received in the ledge 120 of the lock body (i.e., molded therein). Thus, when the side frame is rotated outwardly to an operative position as shown in the drawings, the lock pin engages an opening in the plastic with an optional reinforcing steel plate of the ledge, and retains or maintains the side frame in this deployed position relative to cross brace assembly. Once the lock pin is depressed via the lock release member, the front leg 22 of the respective side frame can pivot or rotate relative to the tube connector/lock housing to urge the side frame to a second or storage position. In this manner, the side frames may be folded relative to the cross brace assembly.

As previously noted, each of the legs includes a dimple 50 to resist torsional forces, for example, between the lower brace 40 and the legs of the side frame. The first leg, on the other hand, desirably rotates relative to the tube connector. By integrally molding the tube connector around the first leg, the plastic shrinks when cured, and a precise mating relation is achieved by molding the tube connector directly over the tubing. This substantially eliminates any play or tolerance difference between the tubular front leg and the tube connector. Thus, not only is the method of manufacture substantially improved at a significant cost reduction, but also the direct molding of the tube connector over the front leg provides a mating fit that eliminates the need for an anti-rattle structure.

This design does not require any attaching hardware to hold the lock pin in place. Rather, the lock pin assembly floats freely in the lock housing. The lock pin assembly is held in place when the lock body is assembled, i.e., when the lock housing and the lock body are in their final preferred positions, thus sandwiching the lock pin in place. Also, the lock release member is simplified over the prior art. The present design is snap-fit into the lock body and rides on top of the lock pin.

Fewer components are required with the present walker, and likewise fewer assembly and sub-assembly operations yield a final product for a substantially lower total cost. Because the polymer or plastic shrinks, the front leg can be torqued or rotated relative to the tube connector after the assembly has been removed from the molding operation. This allows the front leg to maintain a close fit with the tube connector, yet pivot relative thereto to allow the side frame to fold. It is estimated that a minimum of twenty-eight (28) components and manufacturing operations are removed relative to that employed in the manufacture of a conventional walker. Four (4) main components of the walker are created in one injection molding operation (and perhaps six components if the lock body is incorporated into the same molding operation) and as a result of the significant reduction in component numbers and assembly operations required to build the present invention, the overall cost is substantially lower. Even then, a more robust design is attained since the cross-sectional area of the side frame tube is not unnecessarily interrupted and an optimal fit is provided between these components.

Figure 11:
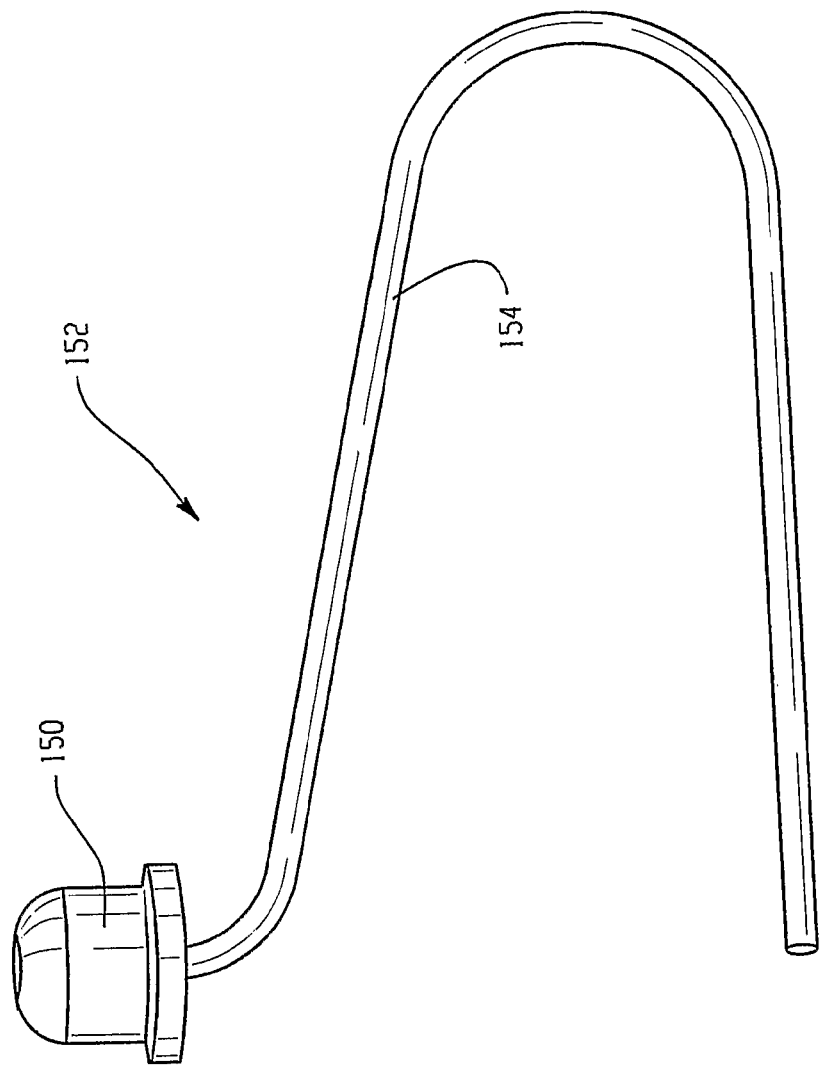
FIG. 11 shows a preferred form of snap button.
Figure 10:
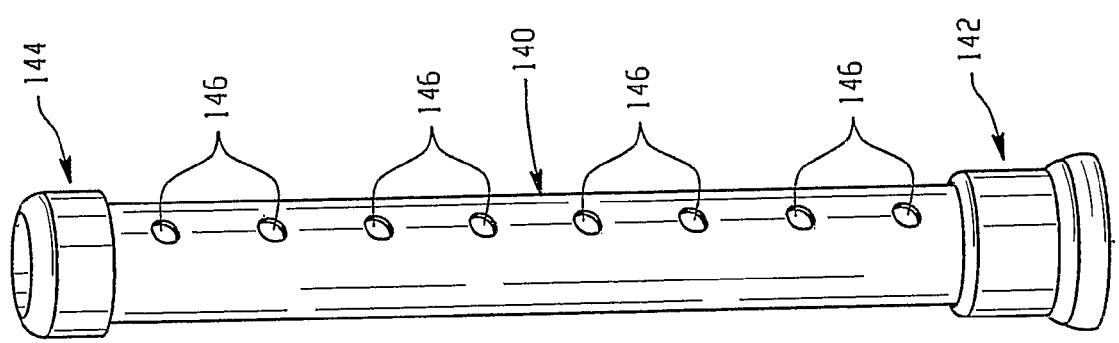
FIG. 10 is a view of a leg extension.

FIGS. 10 and 11 illustrate a leg extension tube assembly 140 as is commonly employed on the lower leg portions of each leg 22, 24 of a walker. Leg extension tube 140 includes a non-slip rubber tip 142 at one end and an anti-rattle member 144 at the opposite end. A series of axially spaced openings 146 are provided in the tube, one of which is selectively aligned over opening 32 provided in the lower portion of each side frame leg. When one of the openings 146 is aligned with the opening 32 in a side frame leg, a head 150 of snap button 152 is urged outwardly by the combination support/biasing spring leg 154. When the snap button head 150 is received through the aligned openings, the leg extension is locked at a desired height relative to the leg portion of the side frame in a manner that is generally conventional in the art.

Figure 12:
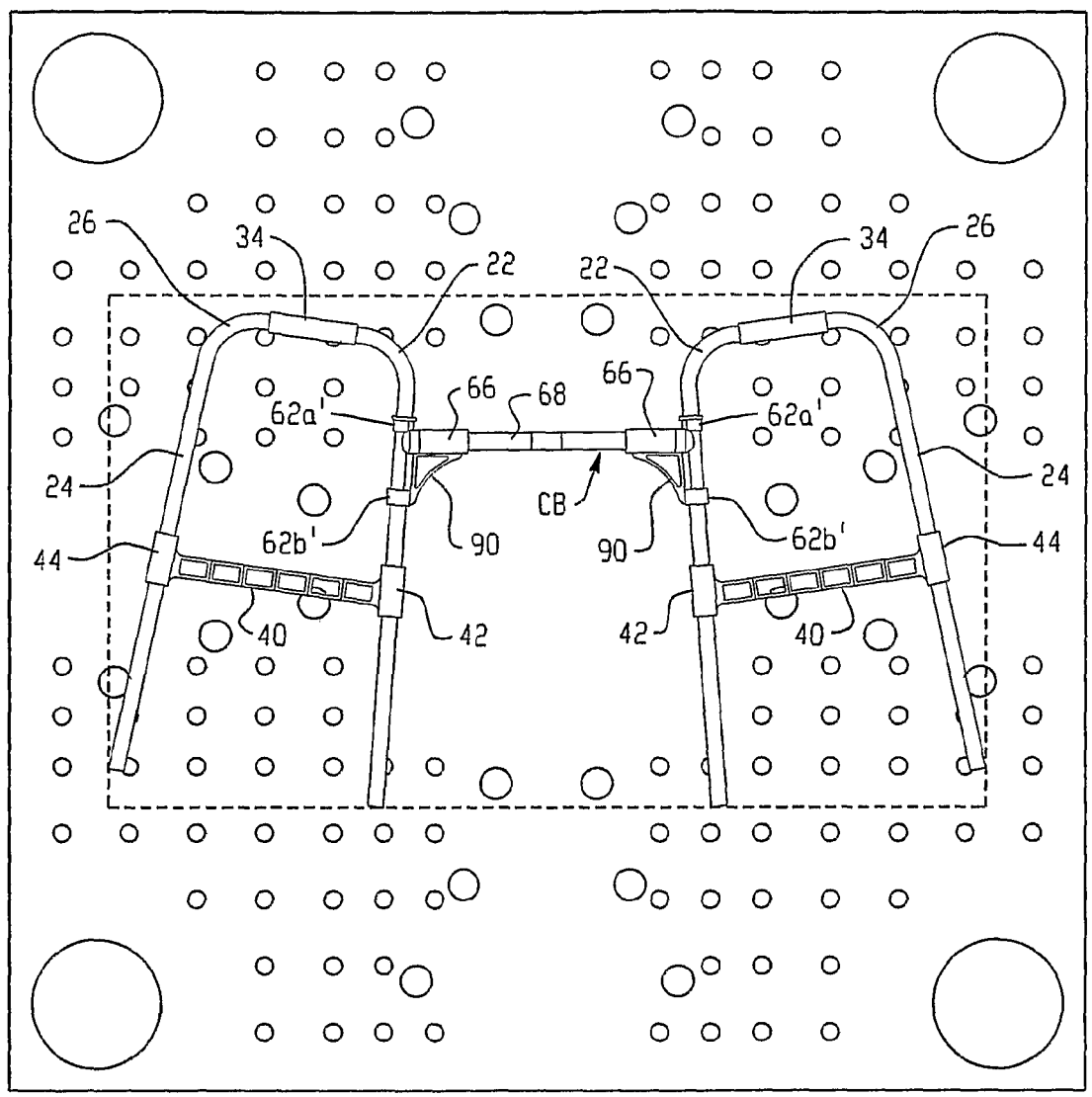
FIG. 12 is plan view of the walker in a press.
Figure 13:
FIGS. 13 AND 14 are end and top views of the walker of FIG. 12 with elements of the press removed for ease of illustration.
Figure 14:
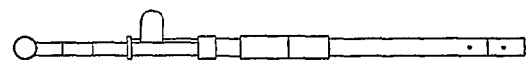

FIGS. 12-14 illustrate how the entire patient aid or walker W is received in a mold or press 200. The side frames SF1 and SF2 are situated as shown, along with cross brace tube 68. The dimple/recess is formed, for example, by a cam that is advanced as movement of the plastic injection ram (not shown) begins. The cam completes the dimple(s) and is separated from engagement with the side frames SF1, SF2, or the cross brace (or wherever else it is desired that the plastic be immovably received around the metal) prior to introduction of the plastic around the dimpled region. As will be appreciated, therefore, the formation of the dimple will preferably occur in the press. However, it is also contemplated that the dimple/recess could be separately formed, although that is not as desirable because of the added manufacturing cost.

Similarly, in accordance with another preferred embodiment, the lock body 110 is formed as a part of a single mold operation. Although it was contemplated that the lock body could be separately molded and then installed over the front leg of the side frame prior to closing the press during formation of the lower brace and tube connector/lock housing, another preferred method is to form a recess or dimple in the front leg of the side frame and introduce the plastic for the lock body as part of the single mold operation. This eliminates the need to subsequently move the lock body into place. It still may be desirable to use a fastener to additionally secure the lock body to the side frame, although the dimple and molding of the lock body secures the lock body from moving relative to the front leg.

Figure 15:
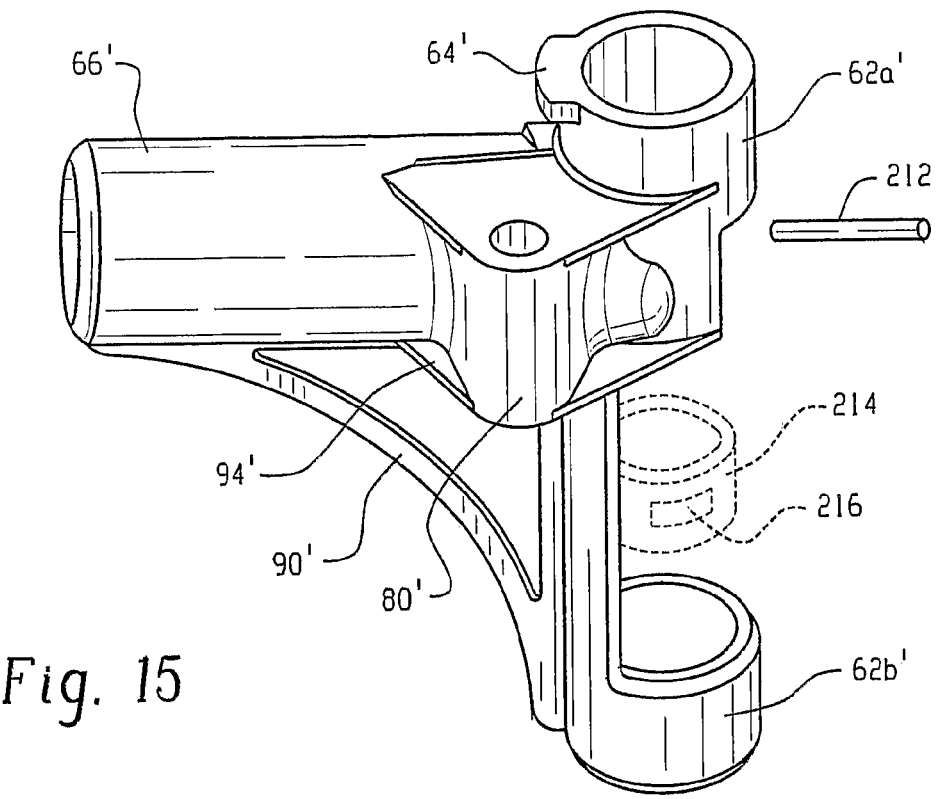
FIGS. 15 and 16 are perspective views of another preferred embodiment of a tube connector/lock housing.
Figure 16:
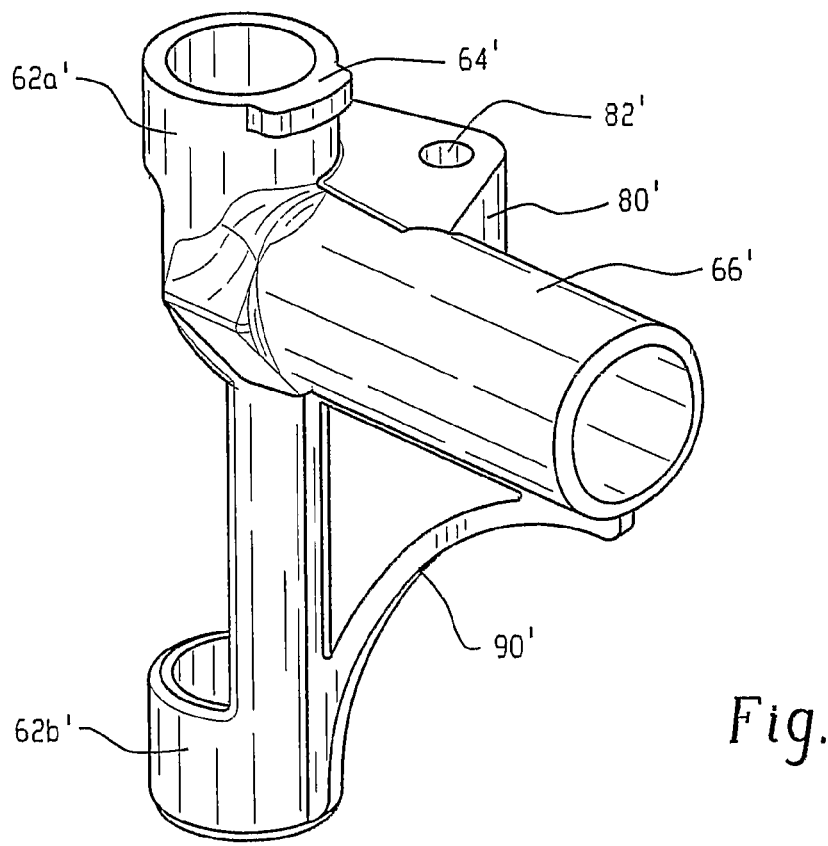

FIGS. 15-16 show a modified tube connector 60'. For ease of illustration and understanding, like reference numerals refer to like elements with the addition of a prime suffix ('), while new reference numerals refer to new components. The most noticeable difference is that the first tubular portion is now divided into two, axially spaced components or bands, namely a first or upper band 62a' and a second or lower band 62b' that define a window 210 therebetween. The bands are interconnected together. During the molding process, the lock body is molded in place as described in the preceding paragraph. The tube connector is also molded at the same time but at a location spaced from the lock body an amount sufficient to allow the pin 84 and spring 86 to be subsequently inserted into the lock housing.

Subsequently, the tube connector and front cross brace assembly is advanced toward the molded lock bodies on the front legs of the side frames. Rather than suspending the tube connector/lock housing from the lock body as previously described in association with FIGS. 4-9, the tube connector is axially supported on the front leg by a fastener such as rivet 212 that is received into the metal tubular leg and extends through the window 210. It will be appreciated that since the tube connector (and likewise the front cross brace) are not suspended from the lock body, the flange 64' is substantially reduced in dimension. That is, the flange 64' only serves to align with the shoulder 116 of the lock body.

It is also contemplated that a third band 212 (shown in dotted line in FIG. 15) could be included in the tube connector/lock housing and have a window 214 that serves the same function as window 210, i.e., to receive the fastener 212 that supports the cross brace after it has been moved upwardly into assembled engagement with the lock body. Thus, when the lock body is molded into place, a gap, for example approximately two inches, is left between the tube connector and the lock body. After the molding operation, the front cross brace assembly containing the tube connector is raised up to engage the lock body and is held in place by fasteners, e.g. rivets, located in the window. Another feature of the window is that it assists in obtaining the proper rotation force required when opening and closing the side frames.

Figure 17:
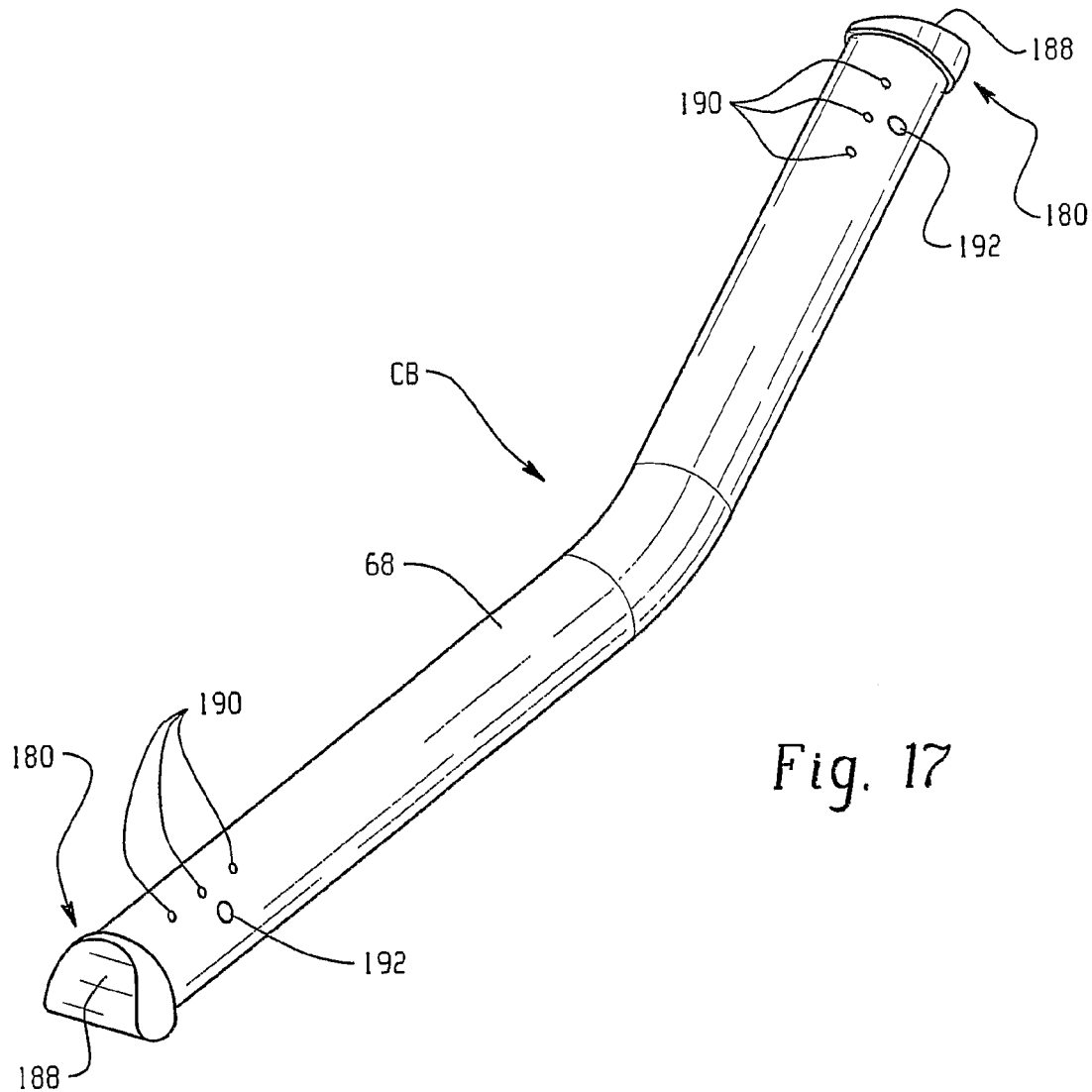
FIG. 17 is a perspective view of the front cross brace with end plugs received in opposite ends.
Figure 18:
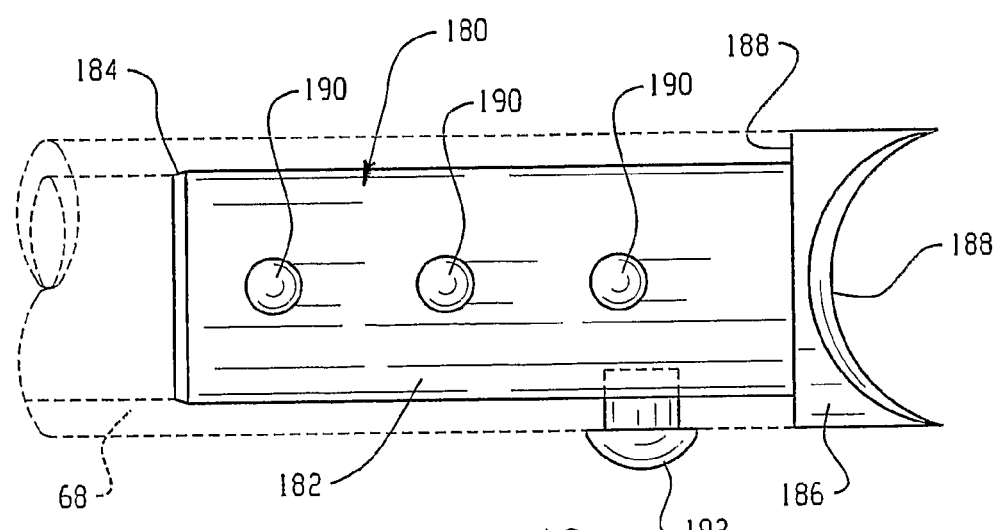
FIG. 18 is an elevational view of one of the end plugs received in the front cross brace.

Although different types of plastic may be used to achieve the desired relative rotation of the plastic component relative to the metal component post-molding, the subject invention preferably uses a glass filled or reinforced nylon in which the melt flow and shrinkage characteristics of the plastic are controlled. A silicone additive comprising approximately ½%-2% of the total provides the desired lubricity of the plastic. Alternatively, the desired post-molding, relative rotation could be accomplished by molding over a thin sleeve positioned over the side frame leg prior to molding. The first and second structural members (namely, the side frames and the front cross brace) are preferably formed of hollow steel or aluminum tubes. However, it is contemplated that a commercial version will not require any silicone additive in the plastic FIG. 17 shows a modified front cross brace CB that includes a hollow metal tube 68 as described previously. Because the tube is hollow, it is preferred to plug opposite ends of the front cross brace prior to molding so that the plastic is prevented from unnecessarily filling the tube. Plugs 180 are illustrated in FIG. 18, and preferably a plug is provided in each end of the front cross brace. Each plug 180 includes a first diameter portion 182 that is chamfered at one end 184 to assist in insertion of the first portion 182 into the hollow tube comprising the front cross brace. A second end of each plug includes an enlarged diameter portion 186 forming a radial shoulder 188 that is larger than the inner diameter opening of the hollow tube and thereby abuts against the end of the front cross brace. The portion 186 of the plug disposed outside of the front cross brace preferably includes an arcuate surface 188 that conforms with the outer surface of the tube defining the front leg of the side frame. This assures that the cross brace will not rotate about a longitudinal axis through the front cross brace, and provides stability to the front cross brace. Since the front cross brace is preferably placed in the mold of FIG. 14, it becomes necessary to secure the plug against pressures that can reach as high as 9,000 psi. Consequently, locking dimples or recesses 90 interlock the metal tube 68 of the front cross brace to the inserted portion 182. A fastener such as rivet 192 has also been used in order to assure that the plug maintains its position at the end of the front cross brace, and thereby assure that the arcuate surface contacts the outer surface of the front leg to prevent rotation.

Figure 19:
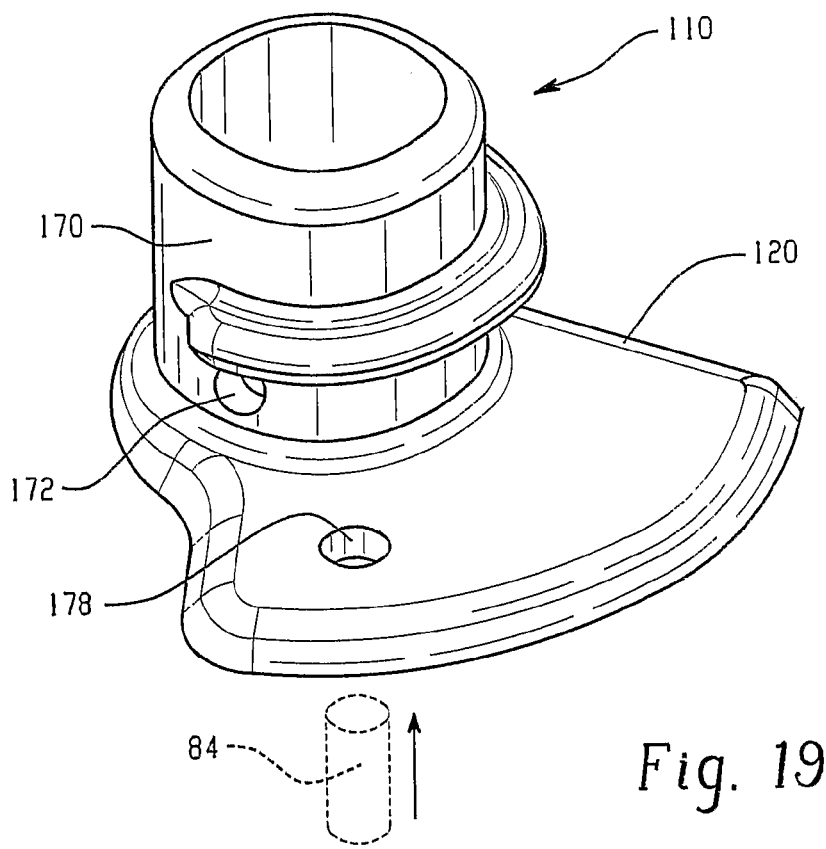
FIGS. 19 and 20 are perspective views of the lock body.
Figure 20:
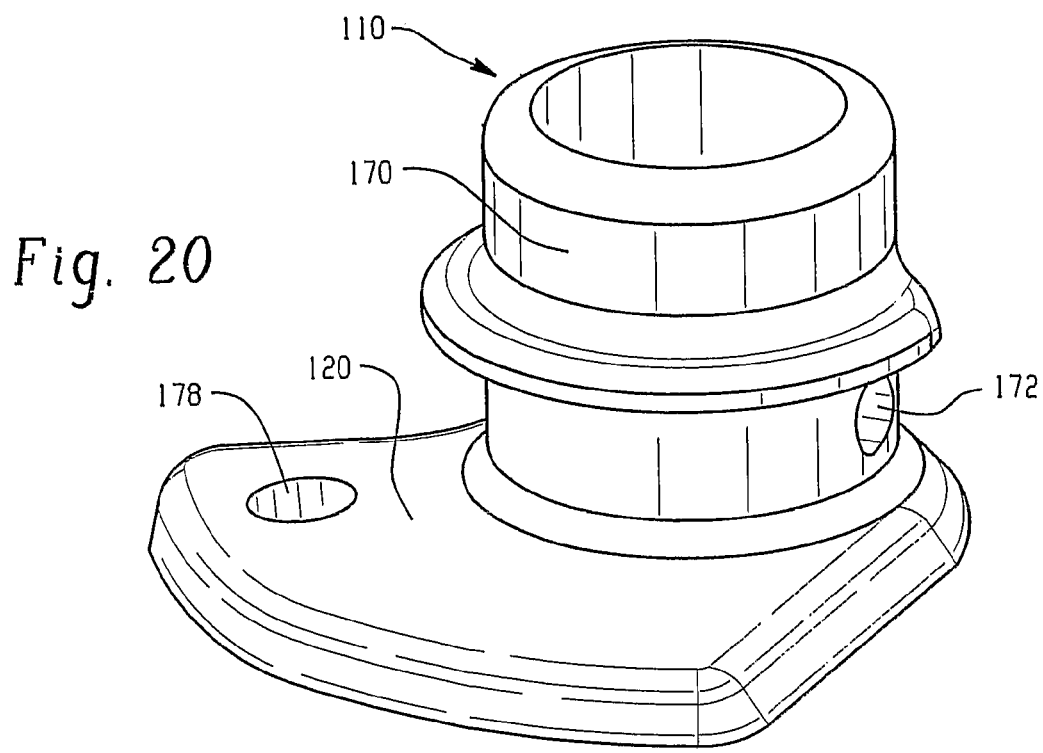
Figure 21:
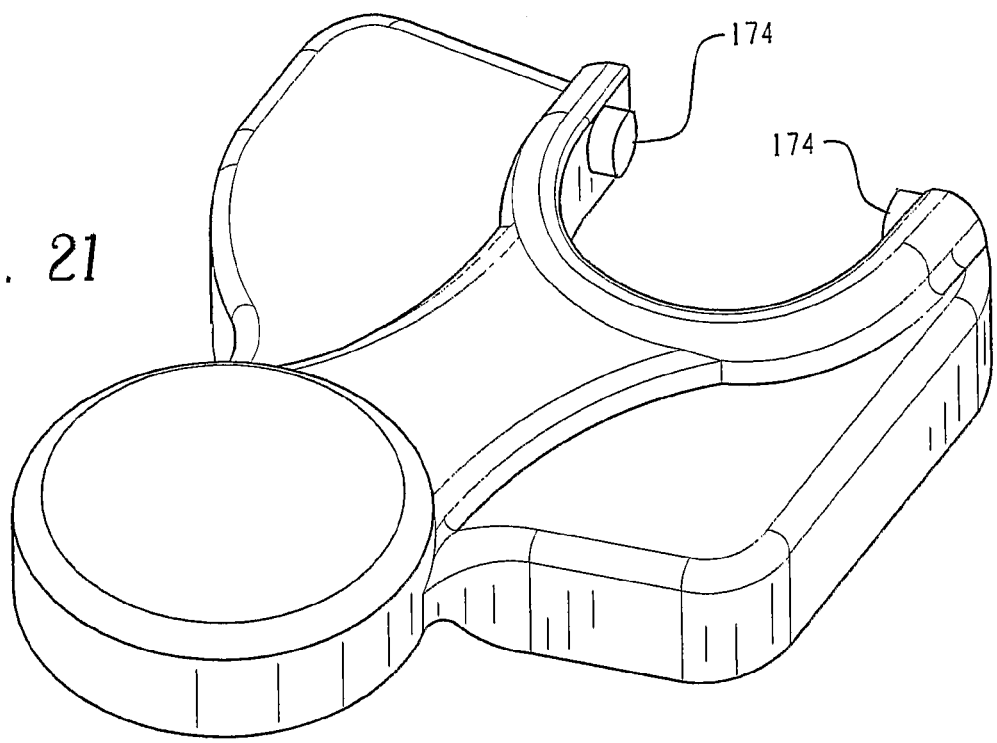
FIGS. 21 and 22 are top and bottom perspective views of the handle.
Figure 22:
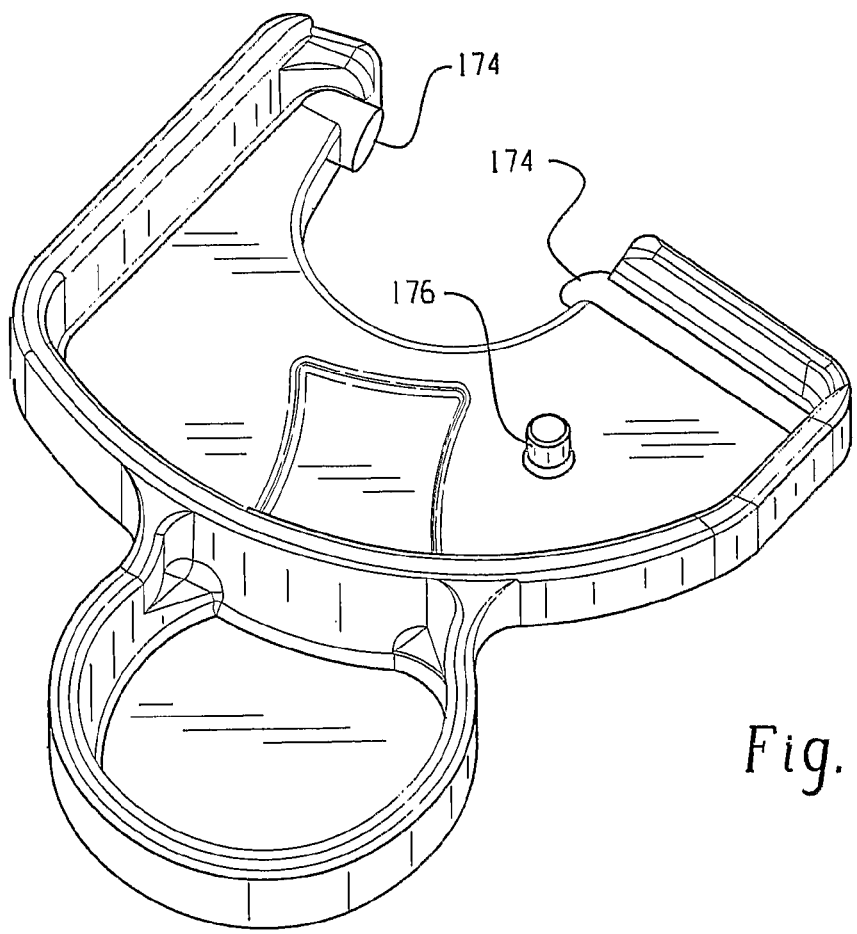

FIGS. 19 and 20 are perspective views of the lock body and particularly illustrate the lock body having a ledge or flange 120. Rather than being mounted by trunnions as shown in the embodiment of FIGS. 8 and 9, the handle shown in FIGS. 21 and 22 is received about a cylindrical portion 170 of the lock body that includes recesses 172 for cooperation with bosses 174 extending inwardly on the handle. In this manner, the handle is easily slid over the lock body and snapped into place subsequent to the molding operation. The bosses then serve as a pivot axis for the handle. The handles are also typically plastic and include a protrusion 176 (FIG. 22) extending outwardly from an underside or bottom surface of the handle. When aligned over the opening 178 in the lock body flange, and when the handle is depressed downwardly, the protrusion engages the pin 84 (represented in phantom in FIG. 19) and urges the pin downwardly against the upward bias of the spring 86 through the flange 120 of the lock body whereby the lock body can then rotate relative to lock housing of the tubular connector. As will be appreciated, the pin rides on the underside of flange 120 as the side frame is folded inwardly toward the front cross brace. When the side frame is opened outwardly, the pin then snaps through the opening 178 to lock the side frame into position.

Figure 23:
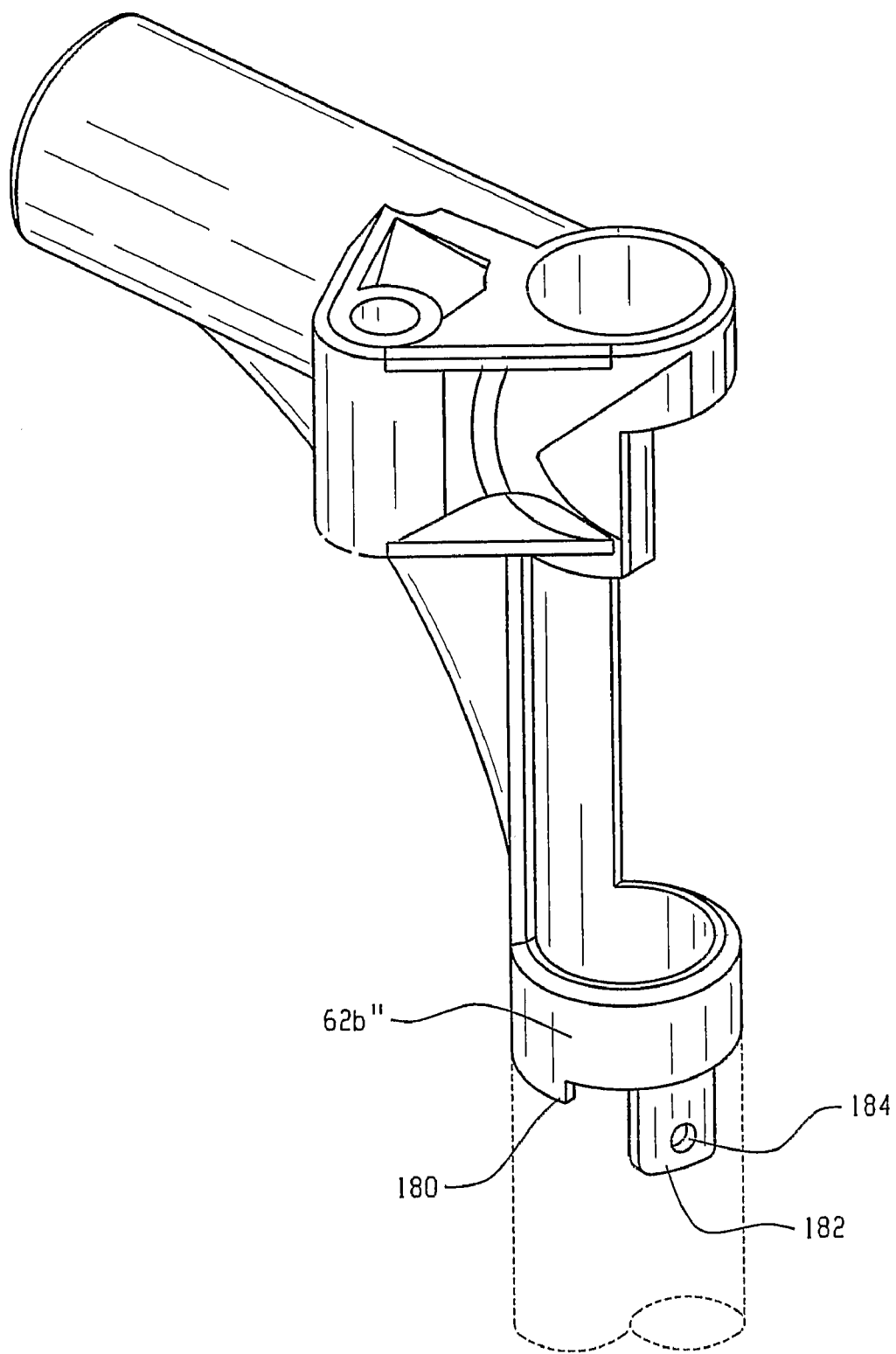
FIGS. 23 and 24 are perspective views of the tube connector.
Figure 24:
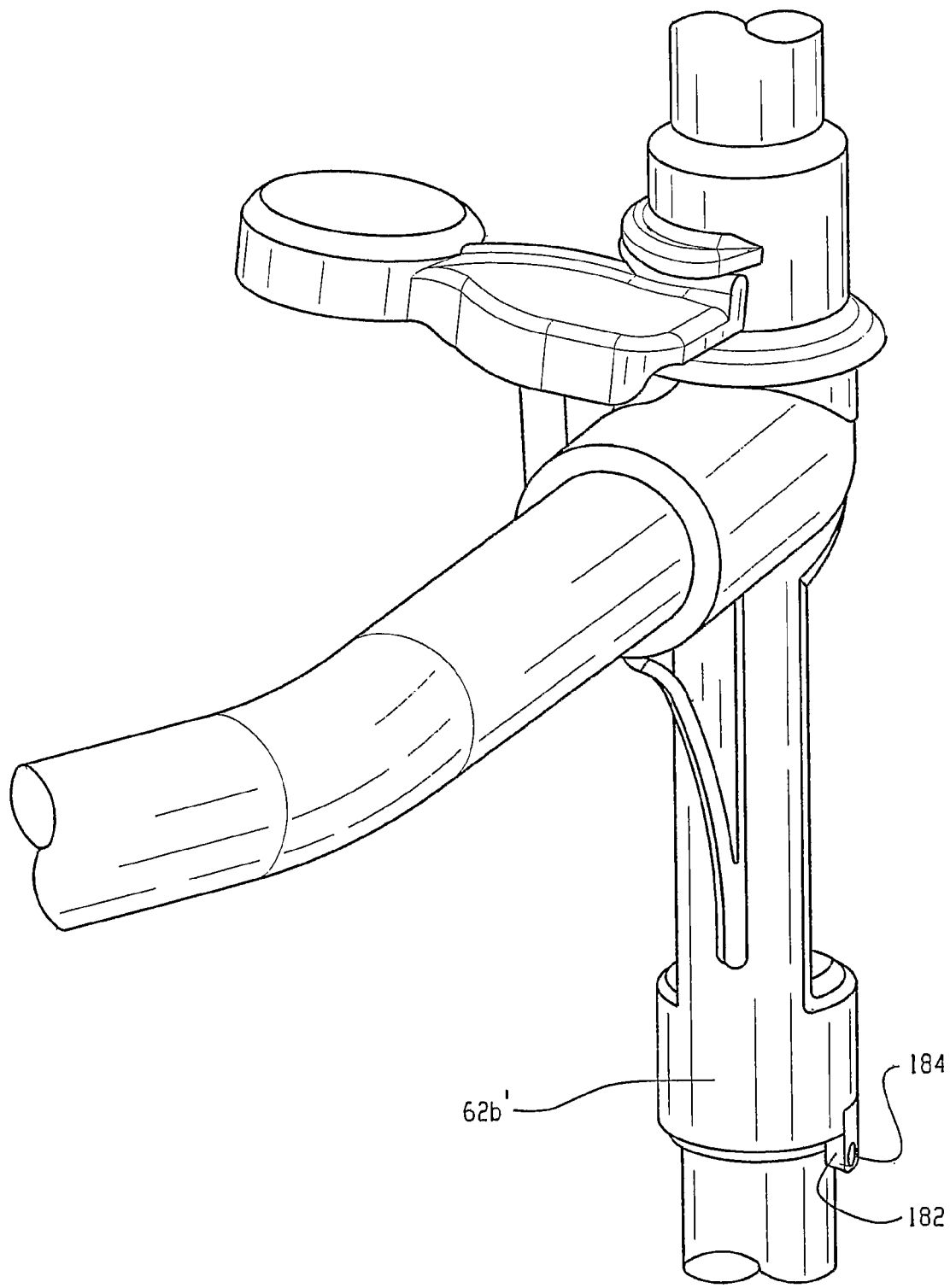

FIGS. 23 and 24 are similar to FIGS. 15 and 16. These views illustrate a slightly different version of the tube connector in which lower band 62B" is modified to include a cutout to define shoulders 180 that selectively cooperate with a stop member 182 secured to the front leg by suitable means such as fastener or rivet 184. As previously described with reference to FIG. 15, stop member 182 is secured to the front leg after the combined front cross brace and tube connector are slid upwardly to the operative position for cooperation with the lock body. The stop member 182 retains the front cross brace assembly in this position. The shoulders 180 define the extent of inward and outward rotation of the side frame relative to the front cross brace. Again, the arrangement operates in substantially the same manner as that described with respect to the third band 212 of FIG. 15.

It is also contemplated that the front cross brace and tube connector could be completed in a separate molding operation, and subsequently assembled to the side frames. For example, the tube connector would be molded over the front cross brace in a first operation and the tube connectors provided at opposite ends of the front cross brace would each include an opening having substantially the same dimension as the outer diameter of the first legs of each side frame. Subsequently, the side frames would be positioned at opposite ends of the front cross brace so that the opening in the tube connector located at each end is received over the lower end of the respective front leg and the tube connector/front cross brace subassembly is slid over the front legs into the desired final position where assembly can then be completed in substantially the same manner as described above.

The invention has been described with reference to the preferred embodiments. Of course, modifications and alterations will become apparent to those of ordinary skill in the art, and the invention should not be limited to the described embodiments. For example, it is possible to mold the hand grip onto the frame as a means of further reducing manufacturing and assembly costs. Certain aspects of the various embodiments may also be used individually or in different combinations. For example, the legs of each side frame may be interconnected with different types of lower braces while the side frames are interconnected to the front cross brace as taught above. Alternatively, the lower braces may be formed as described above wherein the plastic encompasses the entire circumference of the metal structural member without any seam, while the side frames are interconnected in a known, conventional manner. Although these alternatives are not believed to be as desirable, it is evident that certain aspects of the invention may be used individually or in combination, and that the scope of this invention should be measured by the claims and not limited to all of the features described herein.

Having thus described the invention, it is now claimed:

1. A method of manufacturing a foldable walker that includes first and second metal structural members joined with plastic and in which one of the first and second structural members can rotate relative to the plastic, the method comprising the steps of:
   providing first and second metal structural members;
   molding a polymer member over the first and second structural members to maintain the structural members in a defined geometrical relation; and
   rotating the first structural member relative to the polymer member after the polymer has cured to form an integral hinge without any seam in the polymer member;
   forming the first structural member as a side frame and forming the second structural member as a front cross brace.

2. The method of claim 1 wherein the polymer member molding step includes interconnecting the side frame to the front cross brace.

3. The method of claim 2 comprising the further step of deforming a portion of the side frame beneath a lock body received thereover so that the lock body does not rotate relative to the side frame.

4. The method of claim 1 comprising the further step of deforming a region of the side frame beneath a lower brace member received thereover so the lower brace member does not rotate relative to the side frame.

5. The method of either claim 1 or 2 wherein the deforming step includes the step of applying pressure as plastic is introduced into the mold.

6. The method of claim 1 comprising the further step of plugging the front cross brace before the molding step.

7. The method of claim 6 wherein the plugging step includes inserting a plug into an open end of the front cross brace and preventing the plug from rotating relative to the front cross brace.

8. The method of claim 7 wherein the preventing step includes deforming a portion of the front cross brace.

9. The method of claim 7 wherein the preventing step includes fastening the front cross brace to the plug.

10. The method of claim 1 comprising the further step of molding a lower brace member about the entire circumference of both front and rear legs of a side frame.

11. The method of claim 1 wherein the polymer molding step includes forming a tube connector having a lock pin housing.

12. The method of claim 11 wherein the tube connector forming step includes integrally forming the lock pin housing with the tube connector.

13. The method of claim 12 including the further step of inserting a pin and biasing member in the lock pin housing.

14. The method of claim 13 further comprising the step of installing a lock body on the side frame, and mounting a release handle on the lock body for selective operative engagement with the pin and allow the side frame to pivot between open and collapsed positions relative to the front cross brace.

15. The method of claim 1 wherein the polymer molding step includes forming a tube connector and advancing the tube connector along the side frame toward into operative relation with a lock body.

16. The method of claim 15 comprising the further step of fastening a stop on the side frame after the advancing step.

* * * * *